(No Model.)
E. BITTENBRING.
Leader-Pipe.
No. 227,208.                    Patented May 4, 1880.
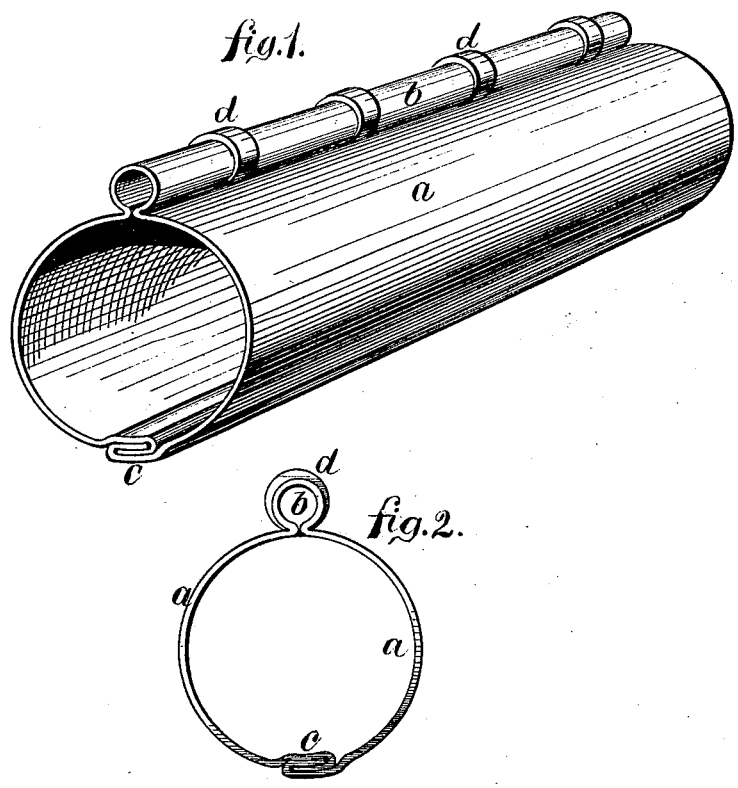
Witnesses:
R. F. Gaylord,
H. B. Freeman
Inventor:
E. O. Bittenbring
By Wm E. Simonds
Atty.

UNITED STATES PATENT OFFICE.

EMIL BITTENBRING, OF HARTFORD, CONNECTICUT.

LEADER-PIPE.

SPECIFICATION forming part of Letters Patent No. 227,208, dated May 4, 1880.

Application filed March 22, 1880. (No model.)

*To all whom it may concern:*

Be it known that I, EMIL BITTENBRING, of Hartford, in the county of Hartford and State of Connecticut, have invented a certain new and useful Improvement in Leader-Pipes, of which the following is a description, reference being had to the accompanying drawings, where—

Figure 1 is a side view of pipe constructed with my improvement. Fig. 2 is an end view of same.

Leader-pipes (those pipes which conduct water from house-roofs to the ground) are in cold climates subject to being burst by the freezing and thawing of water inside them. To meet this difficulty the well-known corrugated pipe has been devised. It only partially cures the difficulty, for the freezing and thawing in such corrugated pipe when it once expands a place in the pipe leaves it permanently expanded, and the next freeze at the same place bursts it.

My invention is intended to cure the trouble.

The pipe $a$, say of four inches diameter, and the small pipe $b$ are formed up of one sheet of metal joined at $c$. The pipe $b$, say five-eighths of an inch in diameter, is clasped at intervals, say, of a foot by the springs $d$, made of brass, steel, or other suitable metal, which tend to hold the small pipe closed, but which will permit pipe $a$ to expand, and will close it to its normal shape when the inducing cause is removed.

I claim as my invention—

The combination of the joined pipes $a$ and $b$, the latter bearing the clasping-springs $d$, all constructed and designed for operation and use substantially as shown and described.

EMIL BITTENBRING.

Witnesses:
WM. E. SIMONDS,
G. H. MOORE.